(12) United States Patent
Ueki (10) Patent No.: US 9,945,442 B2
(45) Date of Patent: Apr. 17, 2018

(54) VIBRATION ISOLATOR (71) Applicant: BRIDGESTONE CORPORATION, Tokyo (JP)

(72) Inventor: Akira Ueki, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 15/034,289

(22) PCT Filed: Nov. 7, 2014

(86) PCT No.: PCT/JP2014/079587
§ 371 (c)(1),
(2) Date: May 4, 2016

(87) PCT Pub. No.: WO2015/068804
PCT Pub. Date: May 14, 2015

(65) Prior Publication Data
US 2016/0298716 A1 Oct. 13, 2016

(30) Foreign Application Priority Data

Nov. 11, 2013 (JP) .................................. 2013-233281
Jun. 19, 2014 (JP) .................................. 2014-126681

(51) Int. Cl.
*F16F 5/00* (2006.01)
*F16F 13/10* (2006.01)
*B60K 5/12* (2006.01)

(52) U.S. Cl.
CPC .......... *F16F 13/107* (2013.01); *B60K 5/1208* (2013.01); *F16F 13/10* (2013.01); *F16F 2230/00* (2013.01)

(58) Field of Classification Search
CPC ........ F16F 13/107; F16F 13/10; F16F 13/106; F16F 2230/00; B60K 5/1208
(Continued)

(56) References Cited

U.S. PATENT DOCUMENTS 4,651,980 A * 3/1987 Morita .................. F16F 13/106
                                                        267/140.13
4,739,962 A    4/1988 Morita et al.
(Continued)

FOREIGN PATENT DOCUMENTS

CN    102414474 A    4/2012
JP     57179448 A    11/1982
(Continued)

*Primary Examiner* — Pamela Rodriguez
(74) *Attorney, Agent, or Firm* — Sughrue Mion, PLLC (57) ABSTRACT

A vibration isolator (10) includes a first attachment member (11), a second attachment member (12), an elastic body (13), and a partition member (16) configured to partition a liquid chamber in the first attachment member in which a liquid (L) is sealed into a first liquid chamber (14) and a second liquid chamber (15). A communicating passage (30) configured to communicate the first liquid chamber with the second liquid chamber is provided in the partition member. A flow changing protrusion (31) is provided at an inner circumferential surface (30a) of the communicating passage. A guide surface (32) opposite to the communicating passage and intersecting the axial direction (O) of the communicating passage is provided at the flow changing protrusion. A passing hole (34) which is open toward both sides in the axial direction is formed by a projecting end (31b) of the flow changing protrusion and another place on the inner circumferential surface (30b) of the communicating passage. The flow changing protrusion changes the flow of the liquid flowing in the communicating passage and reaching the guide surface toward the projecting end. The guide surface is formed in a concave curved surface shape which is recessed in the axial direction.

7 Claims, 4 Drawing Sheets

(58) Field of Classification Search
USPC .............. 267/140.13, 140.11, 140.4, 141.4; 248/562, 636, 638
See application file for complete search history.

(56) References Cited

U.S. PATENT DOCUMENTS

| | | |
|---|---|---|
| 2011/0006466 A1 | 1/2011 | Ichikawa et al. |
| 2012/0091640 A1 | 4/2012 | Ogawa et al. |

FOREIGN PATENT DOCUMENTS

| | | | |
|---|---|---|---|
| JP | 5818143 | U | 2/1983 |
| JP | 2006-275255 | A | 10/2006 |
| JP | 2007-120598 | A | 5/2007 |
| JP | 2009-150451 | A | 7/2009 |
| JP | 2009-236143 | A | 10/2009 |
| JP | 2010038179 | A | 2/2010 |
| JP | 2011256930 | A | 12/2011 |
| JP | 2012-172736 | A | 9/2012 |
| JP | 2013217391 | A | 10/2013 |

* cited by examiner

VIBRATION ISOLATOR

TECHNICAL FIELD

The present invention relates to a vibration isolator which is applied to, for example, vehicles, industrial machines, and so on, and absorbs and attenuates vibrations of vibration generating parts such as engines.

The application is a National Stage of International Application No. PCT/JP2014/079587, filed on Nov. 7, 2014, based on and claims the benefit of priority from prior Japanese Patent Applications No. 2013-233281, filed Nov. 11, 2013 and No. 2014-126681, filed Jun. 19, 2014, the entire contents of which are incorporated herein.

BACKGROUND ART

Constitutions such as that disclosed in, for example, Patent Document 1 are known as this type of vibration isolator. This vibration isolator includes a first tubular attachment member coupled to one of the group consisting of a vibration generating part and a vibration receiving part, a second attachment coupled to the other part, an elastic body coupling the attachment members to each other, and partition members configured to partition a liquid chamber in the first attachment member in which a liquid is sealed into a first liquid chamber and a second liquid chamber. The vibration isolator further includes a first restriction passage and a second restriction passage which communicate the liquid chambers with each other, a cylinder chamber provided between the liquid chambers, and a plunger member arranged movably between an open position and a closed position in the cylinder chamber.

A plurality of types of vibrations with different frequencies such as, for example, an idle vibration and a shake vibration are input to the vibration isolator. Resonance frequencies of the first restriction passage and the second restriction passage are set (tuned) to frequencies of the different types of vibrations in the vibration isolator. The plunger member is moved between the open position and the closed position according to frequencies of the input vibrations so that the restriction passage through which the liquid flows is switched between the first restriction passage and the second restriction passage.

DOCUMENT OF RELATED ART

Patent Document

Patent Document 1
  Japanese Unexamined Patent Application, First Publication No. 2007-120598

SUMMARY OF INVENTION

Technical Problem

However, there is room for improvement in terms of simplification of a structure and facilitation of manufacture in the conventional vibration isolator.

Also, in the conventional vibration isolator, when unintentional vibrations such as, for example, minute vibrations higher in frequency and remarkably smaller in amplitude than a resonance frequency of a restriction passage determined by the path length, the cross-sectional area, and so on of the restriction passage are input, a dynamic spring constant increases due to, for example, clogging of the restriction passage, and this influences product features of the vibration isolator such as, for example, ride comfort of vehicles in some cases.

The present invention was made in view of the above-described circumstances, and an object of the present invention is to provide a vibration isolator in which simplification of a structure and facilitation of manufacture can be achieved while product features are secured.

Solution to Problem

In order to accomplish the object, the present invention suggests the following means.

According to a first aspect of the present invention, there is provided a vibration isolator including a first tubular attachment member coupled to one of the group consisting of a vibration generating part and a vibration receiving part, a second attachment member coupled to the other of the vibration generating part and the vibration receiving part, an elastic body configured to couple together the first attachment member and the second attachment member, and a partition member configured to partition a liquid chamber in the first attachment member in which a liquid is sealed into a first liquid chamber and a second liquid chamber. A portion of a wall surface in at least one of the group consisting of the first liquid chamber and the second liquid chamber is formed using the elastic body. A communicating passage configured to communicate the first liquid chamber with the second liquid chamber is provided in the partition member. A flow changing protrusion protruding from an inner circumferential surface of the communicating passage and configured to change the flow of the liquid flowing in the communicating passage in the axial direction thereof is provided in the inner circumferential surface. A guide surface facing the communicating passage and intersecting the axial direction is provided at the flow changing protrusion. A passing hole which is open on both sides in the axial direction is formed by a projecting end of the flow changing protrusion and another place on the inner circumferential surface of the communicating passage. The flow changing protrusion is configured to change the flow of the liquid flowing in the communicating passage and reaching the guide surface toward the projecting end. The guide surface is formed in a concave curved surface shape which is recessed in the axial direction.

According to the first aspect of the present invention, when the vibrations are input to the vibration isolator, the liquid flows through the communicating passage in the axial direction between the first liquid chamber and the second liquid chamber and reaches a portion in the communicating passage at which the flow changing protrusion is positioned. In this case, some of the liquid flowing through the communicating passage reaches the guide surface of the flow changing protrusion and flows toward a projecting end from a side of a base end of the flow changing protrusion along the guide surface. Also, the rest of the liquid flowing through the communicating passage is caused to flow in the axial direction without flowing toward the guide surface of the flow changing protrusion and directly flow toward the passing hole to pass through the passing hole in the axial direction.

In this case, when the flow rate of the liquid increases, pressure loss of the liquid is increased due to, for example, energy loss when the liquid whose flow is changed by the flow changing protrusion and the liquid directly flowing toward the passing hole collide with each other and so on, thereby absorbing and attenuating the vibrations. Also, since the guide surface of the flow changing protrusion is formed in the concave curved surface shape which is recessed in the axial direction, the flow of the liquid is changed by the flow changing protrusion, thereby reversing a direction of the flow with respect to the axial direction. Therefore, the liquid collides with the liquid directly flowing toward the passing hole from an opposite side in the axial direction, thereby effectively increasing the pressure loss of the liquid.

On the other hand, if the flow rate of the liquid is slow, the pressure loss of the liquid due to the above-described collision of the liquid is suppressed, and the liquid smoothly flows in the communicating passage, thereby suppressing an increase of the dynamic spring constant of the vibration isolator.

According to the vibration isolator, the pressure loss of the liquid is increased according to the flow rate of the liquid flowing in the communicating passage so that the vibration can be absorbed and attenuated. Thus, for example, when normal vibrations such as an idle vibration and a shake vibration are input, the vibrations can be absorbed and attenuated irrespective of frequencies of the vibrations. Therefore, a plurality of types of vibrations with different frequencies can be appropriately absorbed and attenuated. Also, since the vibration isolator does not include a plunger member which is movably provided and so on, occurrence of abnormal noise is suppressed so that simplification of a structure and facilitation of manufacture can be achieved.

The liquid smoothly flows in the communicating passage while the pressure loss of the liquid with a slow flow rate is suppressed, thereby limiting the increase of the dynamic spring constant. Therefore, for example, when the flow rate of the liquid is slower than that when normal vibrations are input such as when unintentional vibrations such as minute vibrations higher in frequency and remarkably smaller in amplitude than the normal vibrations are input, the increase of the dynamic spring constant can be suppressed. As a result, product features of the vibration isolator can be easily secured.

According to a second aspect of the present invention, in the first aspect, the guide surface faces an opening of the communicating passage in the partition member in the axial direction.

According to the second aspect, since the guide surface faces an opening of the communicating passage in the partition member in the axial direction, there is no constitution disturbing the flow of the liquid between the opening and the guide surface and the liquid whose flow disturbance is suppressed can be caused to reliably reach the guide surface. In other words, the liquid can be caused to reach the guide surface while maintaining high kinetic energy, and the kinetic energy of the liquid whose flow is changed by the flow changing protrusion can be maintained at a high level. The liquid with high kinetic energy collides with another part of the liquid directly flowing toward the passing hole. Thus, the pressure loss of the liquid can be effectively increased.

According to a third aspect of the present invention, in the first or second aspect, a restriction passage provided at a different position from the communicating passage and configured to communicate the first liquid chamber with the second liquid chamber is provided in the partition member.

According to the third aspect, when the vibrations are input, the flow rate of the liquid flowing through the communicating passage is increased, and if the pressure loss of the liquid increases, flow resistance of the liquid flowing through the communicating passage is increased. As a result, the liquid actively flows through the restriction passage between the first liquid chamber and the second liquid chamber. In this case, resonance occurs in the restriction passage, thereby further absorbing and attenuating the input vibrations.

As described above, for example, when the normal vibrations are input, the vibrations can also be absorbed and attenuated by the pressure loss of the liquid and the resonance in the restriction passage. Thus, the vibrations can be effectively absorbed and attenuated.

According to a fourth aspect of the present invention, in any one of the first to third aspects, the guide surface is provided line-asymmetrically with respect to the axis of the communicating passage.

According to the fourth aspect, since the guide surface is provided line-asymmetrically with respect to the axis of the communicating passage, the flow changing protrusion at which the guide surface is provided is also provided line-asymmetrically with respect to the axis of the communicating passage. In other words, the flow changing protrusion is provided at one of two places on the inner circumferential surface of the communicating passage opposite to each other to surround the axis. For this reason, the flow changing protrusion is easily disposed near a central portion (in the vicinity of the axis) of the communicating passage in which the flow rate of the flow of the liquid flowing in the communicating passage is highest, and the guide surface of the flow changing protrusion is easily disposed near the central portion. Therefore, the liquid flowing along the central portion of the communicating part at a high flow rate can be caused to effectively collide with the guide surface of the flow changing protrusion to increase the pressure loss of the liquid so that attenuation of the vibrations can be increased.

According to a fifth aspect of the present invention, in any one of the first to fourth aspects, the flow changing protrusion is configured to cause the liquid flowing in the communicating passage in a first direction and reaching the guide surface to flow along the guide surface in the concave curved surface shape to change the flow of the liquid to a second direction substantially opposite to the first direction.

Effects of Invention

According to the vibration isolator related to the present invention, occurrence of abnormal noise is suppressed while product features are secured so that simplification of a structure and facilitation of manufacture can be achieved.

DESCRIPTION OF EMBODIMENTS

Hereinafter, a vibration isolator related to an embodiment of the present invention will be described with reference to FIGS. 1 to 3.

Figure 1:
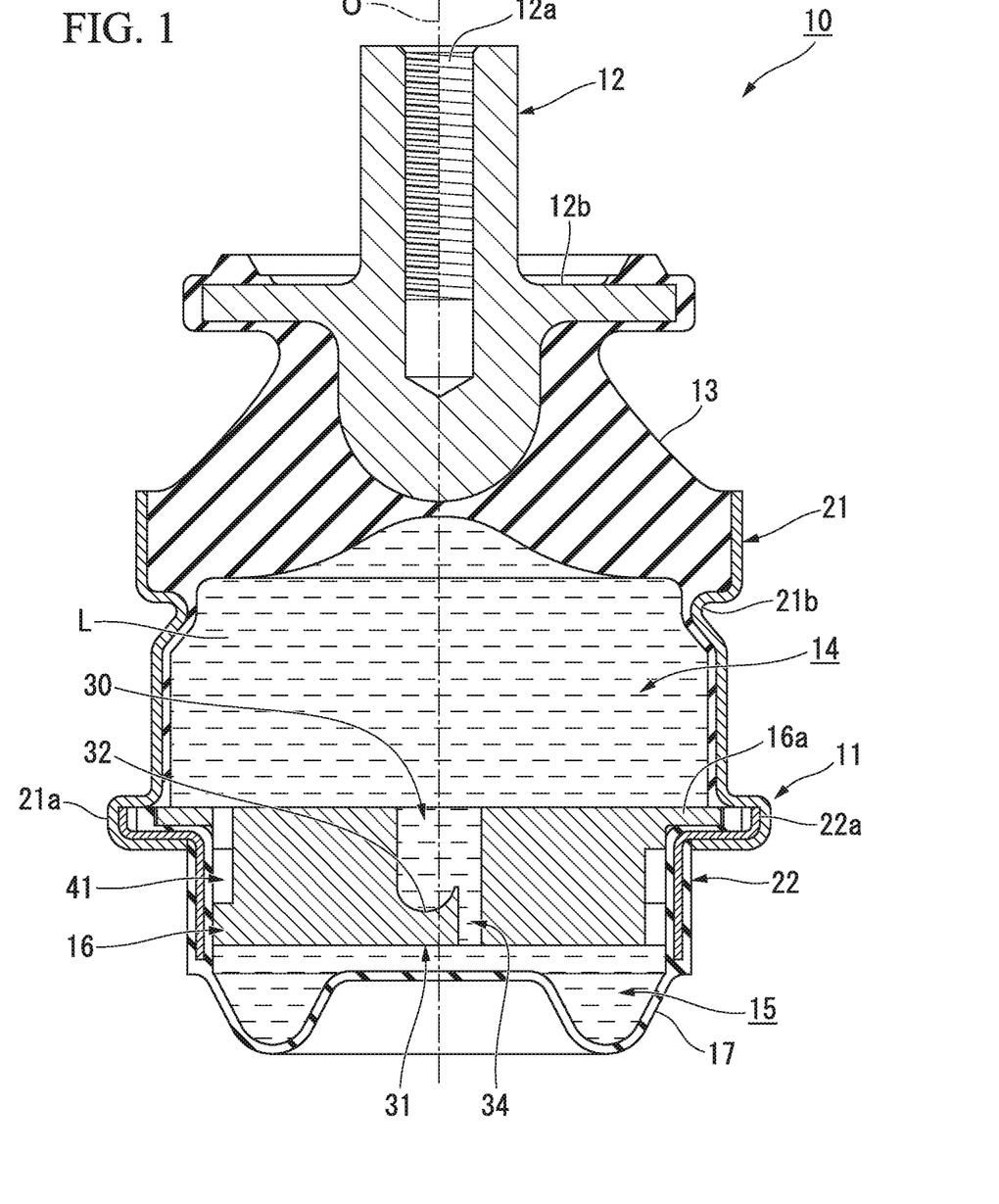
FIG. 1 is a longitudinal cross-sectional view of a vibration isolator related to an embodiment of the present invention.

As shown in FIG. 1, a vibration isolator 10 includes a first tubular attachment member 11 coupled to one of the group consisting of a vibration generating part and a vibration receiving part, a second attachment member 12 coupled to the other thereof, an elastic body 13 configured to couple the attachment members 11 and 12 to each other, and a partition member 16 configured to partition a liquid chamber in the first attachment, member 11 in which a liquid L is sealed into a main liquid chamber (a first liquid chamber) 14 having the elastic body 13 as a portion of a wall surface and a subsidiary liquid chamber (a second liquid chamber) 15.

The second attachment member 12 is formed in a columnar shape, the elastic body 13 is formed in a tubular shape, and the first attachment member 11, the second attachment member 12, and the elastic body 13 are disposed coaxially with a common axis in FIG. 1. Hereinafter, the common axis is referred to as an axis (an axis (a central axis) of the first attachment member or an axis (a central axis) of the communicating passage to be described) O, a side of the main liquid chamber 14 in an axis O direction (an axial direction of the communicating passage) is referred to as the first side, and a side of the subsidiary liquid chamber 15 is referred to as the second side. A direction perpendicular to the axis O is referred to as a radial direction (a radial direction of the communicating passage), and a direction around the axis O is referred to as a circumferential direction (a circumferential direction of the communicating passage).

When the vibration isolator 10 is mounted on a vehicle, for example, the second attachment member 12 is coupled to an engine serving as the vibration generating part, and the first attachment member 11 is coupled to a vehicle body serving as the vibration receiving part via a bracket (not shown), the vibration isolator 10 suppresses vibrations of the engine from being transferred to the vehicle body. The vibration isolator 10 is a liquid sealed type in which the liquid L such as, for example, ethylene glycol, water, or silicone oil is sealed in the liquid chamber of the first attachment member 11.

The first attachment member 11 includes a first outer rim body 21 at the first, side in the axis O direction and a second outer rim body 22 at the second side.

The elastic body 13 is coupled to an end of the first outer rim body 21 of the first side in a liquid-tight state, and an opening of the first outer rim body 21 of the first side is closed by the elastic body 13. An end 21a of the first outer rim body 21 of the second side is formed larger in diameter than other portions. Also, the inside of the first outer rim body 21 is the main liquid chamber 14. A liquid pressure of the main liquid chamber 14 changes as the elastic body 13 is deformed and an inner capacity of the main liquid chamber 14 is changed when vibrations are input to the vibration isolator 10.

An annular groove 21b which continuously extends throughout the entire circumference is formed in a portion joined from the second side to a portion of the first outer rim body 21 to which the elastic body 13 is coupled.

A diaphragm 17 is coupled to an end of the second outer rim body 22 of the second side in a liquid-tight state, and an opening of the second outer rim body 22 of the second side is closed by the diaphragm 17. An end 22a of the second outer rim body 22 of the first side is formed larger in diameter than other portions and is fitted into the end 21a of the first outer rim body 21 of the second side. A partition member 16 is fitted into the second outer rim body 22, and a portion inside the second outer rim body 22 disposed between the partition member 16 and the diaphragm 17 is the subsidiary liquid chamber 15. The subsidiary liquid chamber 15 has the diaphragm 17 as a portion of the wall surface and is expanded or contracted as the diaphragm 17 is deformed. The second outer rim body 22 is covered with a rubber membrane integrally formed with the diaphragm 17 from the inside in the radial direction and the outside in the radial direction over approximately the entire area.

A female thread part 12a is formed coaxially with the axis O of an end surface of the second attachment member 12 of the first side. The second attachment member 12 protrudes from the first attachment member 11 to the first side. A flange part 12b protruding outward in a radial direction and continuously extending throughout the entire circumference is formed on the second attachment member 12. The flange part 12b is away from an edge of the first attachment member 11 of the first side to the first side.

The elastic body 13 is formed by an elastically deformable rubber material, for example, and is formed in a tubular shape whose diameter is gradually increased from the first side toward the second side. An end of the elastic body 13 of the first side is coupled to the second attachment member 12, and an end of the second side thereof is coupled to the first attachment member 11.

Note that an inner circumferential surface of the first outer rim body 21 of the first attachment member 11 is covered with a rubber membrane integrally formed with the elastic body 13 over approximately the entire area.

The partition member 16 is formed in a discoid shape whose central axis is disposed coaxially with the axis O and is fitted into the first attachment member 11. A flange part 16a protruding outward in a radial direction is provided at the partition member 16. The flange part 16a is provided at an end of the partition member 16 of the first side. The flange part 16c is disposed in the end 22a of the second outer rim body 22 of the first side.

A communicating passage 30 configured to communicate the main liquid chamber 14 with the subsidiary liquid chamber 15 is provided in the partition member 16. The main liquid chamber 14 and the subsidiary liquid chamber 15 are communicated via the communicating passage 30. The communicating passage 30 extends in the axis O direction and is individually open at both end surfaces of the partition member 16 in the axis O direction. The communicating passage 30 extends in a linear shape in the axis O direction and is formed in a columnar shape coaxially with the axis O.

Figure 2:
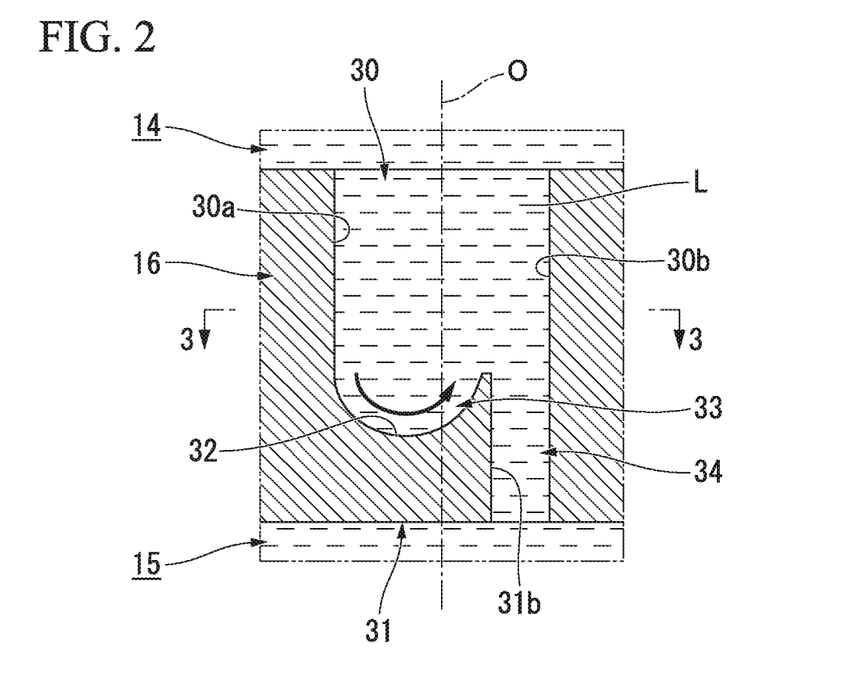
FIG. 2 is an enlarged view of a major part of the longitudinal cross-sectional view of the vibration isolator shown in FIG. 1.
Figure 3:
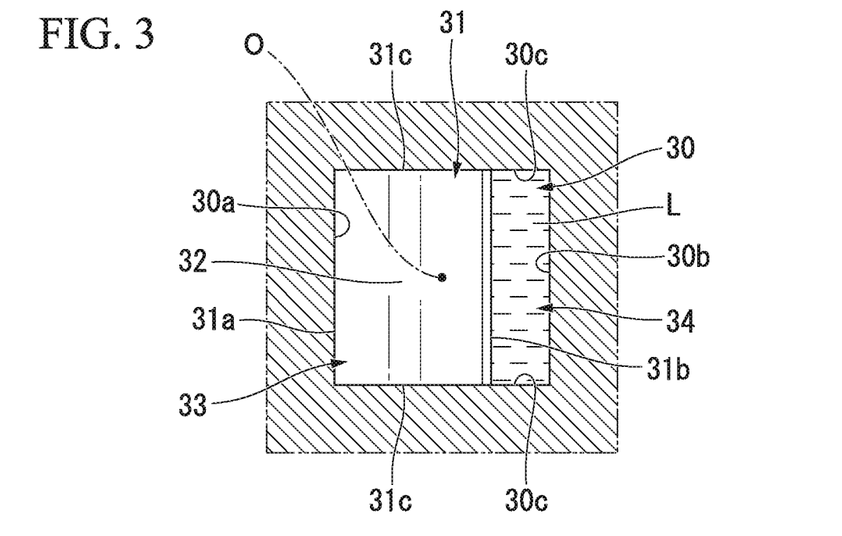
FIG. 3 is a cross-sectional view taken along line 3-3 shown in FIG. 2.

As shown in FIGS. 2 and 3, the communicating passage 30 is formed in a polygonal columnar shape, and in a quadrangular columnar shape in the embodiment. An inner circumferential surface of the communicating passage 30 is formed of four rectangular flat surfaces 30a, 30c, 30b, and 30c which extend in the axis O direction. The reference flat surface 30a, the opposite flat surface 30b opposite to the reference flat surface 30a, and die pair of coupling flat surfaces 30c configured to individually couple together the reference flat surface 30a and the opposite flat surface 30b are provided as the four flat surfaces.

In the embodiment, a flow changing protrusion 31 configured to change the flow of the liquid L flowing in the communicating passage 30 is provided at the inner circumferential surface (the reference flat surface 30a) of the communicating passage 30. The flow changing protrusion 31 protrudes from the inner circumferential surface of the communicating passage 30. In other words, the flow changing protrusion 31 protrudes from the inner circumferential surface of the communicating passage 30 toward another place on the inner circumferential surface of the communicating passage 30 opposite to the inner circumferential surface to surround the axis O. The flow changing protrusion 31 changes the flow of liquid L flowing in the communicating passage 30 in the axis O direction. The flow changing protrusion 31 is integrally formed with the partition member 16 using, for example, a resin material, as a rigid body having a rigidity that prevents it from being remarkably deformed when receiving the flow of the liquid L.

One flow changing protrusion 31 is provided at the communicating passage 30 in the embodiment. The flow changing protrusion 31 protrudes from the reference flat surface 30a in a radial direction and intersects the axis O. The flow changing protrusion 31 has a rectangular shape when seen in a cross section of the communicating passage 30 perpendicular to the axis O. An outer circumferential edge of the flow changing protrusion 31 when seen from the axis O direction is formed by a base end 31a coupled to the reference flat surface 30a, a projecting end 31b extending in parallel with the base end 31a, and a pair of lateral ends 31c configured to couple together the base end 31a and the projecting end 31b.

The base end 31a of the flow changing protrusion 31 is formed in a linear shape along the reference flat surface 30a when seen in the cross section and is coupled to the reference flat surface 30a over the entire length. The projecting end 31b of the flow changing protrusion 31 is positioned at the opposite side of the base end 31a to surround the axis O and is separated from the opposite flat surface 30b over the entire length. The projecting end 31b is a tip in a projecting direction (right in FIGS. 2 and 3) of the flow changing protrusion 31 from the inner circumferential surface of the communicating passage 30. The pair of lateral ends 31c in the flow changing protrusion 31 are individually coupled to the pair of coupling flat surfaces 30c and are coupled to the coupling flat surfaces 30c over the entire length.

A guide surface 32 disposed in the communicating passage 30 and facing the axis O direction is provided at the flow changing protrusion 31. In other words, the guide surface 32 facing the communicating passage 30 and intersecting the axis O direction is provided at the flow changing protrusion 31. The flow changing protrusion 31 in the embodiment is provided at an end of the communicating passage 30 in the axis O direction (an end of the second side). The flow changing protrusion 31 is provided at an opening of the communicating passage 30 of the second side, and a surface of the flow changing protrusion 31 facing the first side is the guide surface 32. A surface of the flow changing protrusion 31 facing the second side is flush with an end surface of the partition member 16 facing the second side.

The flow changing protrusion 31 is configured to change the flow of the liquid L flowing in the communicating passage 30 in the axis O direction and reaching the guide surface 32 toward the projecting end 31b of the flow changing protrusion 31. The flow changing protrusion 31 causes the liquid L to flow along the guide surface 32, thereby bending the flow of the liquid L. The flow changing protrusion 31 is configured to cause the liquid L flowing in the communicating passage 30 in a first direction (a direction from first side in the axis O direction toward the second side) and reaching the guide surface 32 to flow along the guide surface 32 in a concave curved surface shape to change the flow of the liquid L to a second direction substantially opposite to the first direction (a direction from the second side in the axis O direction toward the first side). Note that "the substantially opposite second direction" includes a reverse direction to the first direction and a direction slightly inclined from the reverse direction. The guide surface 32 faces the opening (the opening of the first side or an upper opening in FIG. 2) of the communicating passage 30 in the partition member 16 in the axis O direction. The guide surface 32 feces the opening of the communicating passage 30 of the first side from the second side.

The guide surface 32 is formed in a concave curved surface shape which is recessed in the axis O direction. The guide surface 32 is formed in a concave curved surface shape which is recessed toward the second side when viewed in a longitudinal cross section passing through the base end 31a and the projecting end 31b of the flow changing protrusion 31 (e.g., FIG. 1). The guide surface 32 defines a flow changing space 33. The flow changing space 33 is defined in the communicating passage 30 to have the guide surface 32 as a portion of the wall surface. The flow changing space 33 is defined by the guide surface 32 and the pair of coupling flat surfaces 30c. The flow changing space 33 is limitedly open toward first side (the first side) in the axis O direction. The guide surface 32 in the embodiment includes a first curved surface gradually inclined from the first side in the axis O direction to the second side and a second curved surface gradually inclined from the second side in the axis O direction to the first side from the base end 31a toward the projecting end 31b. The first curved surface is positioned near the base end 31a, and the second curved surface is positioned near the projecting end 31b.

The guide surface 32 is provided line-asymmetrically with respect to the axis (the axis O in the embodiment) of the communicating passage 30. The line asymmetry with respect to the axis of the communicating passage 30 refers to asymmetry with respect to two-fold rotational symmetry (360°/n and n=2) with respect to the axis. In other words, the guide surface 32 is provided not to be symmetric when rotated 180° about the axis of the communicating passage 30. The axis of the communicating passage 30 is the central axis of the communicating passage 30 and is, for example, a line passing through a center of gravity of a shape seen in a cross section of the communicating passage 30 (see FIG. 3).

The projecting end 31b of the flow changing protrusion 31 forms an inner circumferential edge of a passing hole 34 which is open toward both sides in the axis O direction (a part of an edge when the passing hole 34 is seen in the axis O direction and see FIG. 3). The passing hole 34 is formed between the projecting end 31b of the flow changing protrusion 31 and the opposite flat surface 30b. In other words, the passing hole 34 which is open toward both sides in the axis O direction is formed by the projecting end 31b of the flow changing protrusion 31 and the opposite flat surface 30b (the other place on the inner circumferential surface) of the communicating passage 30 opposite to the reference flat surface 30a (the inner circumferential surface) to which the base end 31a of the flow changing protrusion 31 is connected. The passing hole 34 is formed in a rectangular shape when seen in the cross section. The passing hole 34 is formed to have the same diameter over the entire length in the axis O direction. In other words, a surface of the projecting end 31b forming the passing hole 34 is formed in parallel with the axis O. The passing hole 34 is open at an end surface of the partition member 16 of the second side and is open toward the subsidiary liquid chamber 15.

A flow path cross-sectional area of the passing hole 34 is less than or equal to half of a maximum flow path cross-sectional area in the remaining portion which is a portion excluding a portion of the communicating passage 30 at which the flow changing protrusion 31 is provided. The remaining portion of the communicating passage 30 is a portion at a different position in the axis O direction (a portion closer to the first side than the flow changing protrusion 31) from the portion at which the flow changing protrusion 31 is provided. Note that, in the illustrated example, the flow path cross-sectional area in the remaining portion is equal irrespective of a position in the axis O direction.

As shown in FIG. 1, a restriction passage 41 is further provided at the partition member 16.

The restriction passage 41 is provided at the partition member 16 independent of the communicating passage 30. In other words, the restriction passage 41 is provided at the partition member 16 at a different position from the communicating passage 30 and communicates the main liquid chamber 14 and the subsidiary liquid chamber 15 with each other. A flow path cross-sectional area of the restriction passage 41 is equal over the entire length in a flow path axial direction of the restriction passage 41.

A resonance frequency of the restriction passage 41 is equal to a frequency of a vibration normally input to the vibration isolator 10, and the restriction passage 41 causes resonance (liquid column resonance) with respect to such a normal input of the vibration (a first vibration). Examples of the normal vibration may include a shake vibration (e.g., with a frequency of 14 Hz or less and an amplitude greater than ±0.5 mm) and an idle vibration higher in frequency and smaller in amplitude than the shake vibration (e.g., with a frequency of 18 Hz to 30 Hz and an amplitude of ±0.5 mm or less).

The resonance frequency of the restriction passage 41 is less than a resonance frequency of the communicating passage 30. The resonance frequency of the communicating passage 30 is equal to a frequency of an unintentional vibration (a second vibration) such as, for example, a minute vibration higher in frequency and remarkably smaller in amplitude than the above-described normal vibration. The resonance frequencies of the communicating passage 30 and the restriction passage 41 are determined based on, for example, flow path lengths, flow path cross-sectional areas, and so on.

The communicating passage 30 is formed such that the liquid L easily flows through the communicating passage preferentially relative to the restriction passage 41 immediately after the normal vibration is input to the vibration isolator 10. Such a constitution can be realized by adjusting, for example, the flow path lengths, the flow path cross-sectional areas, and so on of the restriction passage 41 and the communicating passage 30.

Next, an action of the vibration isolator 10 will be described.

When vibrations in the axis O direction are input to the vibration isolator 10 shown in FIG. 1 from the vibration generating part, both of the attachment members 11 and 12 elastically deform and relatively displace the elastic body 13, thereby changing a liquid pressure of the main liquid chamber 14. Then, the liquid L is caused to be exchanged through the communicating passage 30 between the main liquid chamber 14 and the subsidiary liquid chamber 15. In this case, in the embodiment, the liquid L is caused to be exchanged through the communicating passage 30 preferentially relative to the restriction passage 41. If the liquid L in the main liquid chamber 14 is caused to flow toward the subsidiary liquid chamber 15 via the communicating passage 30, the liquid L first flows into the communicating passage 30 from the opening of the communicating passage 30 of the first side (flows in the first direction) and reaches the portion of the communicating passage 30 at which the flow changing protrusion 31 is positioned.

As shown in FIG. 2, some of the liquid L flows into the flow changing space 33 and reaches the guide surface 32, and the rest thereof is caused to flow in the first direction without flowing toward the guide surface 32 and directly flow toward the passing hole 34 to pass through the passing hole 34. Note that, since the guide surface 32 faces the opening of the communicating passage 30 of the first side from the second side in the embodiment, the liquid L whose flow disturbance is suppressed can be caused to reliably reach the guide surface 32.

The liquid L reaching the guide surface 32 flows from a side of the base end 31a of the flow changing protrusion 31 toward the projecting end 31b along the guide surface 32. Thus, the flow of the liquid L is changed in a radial direction.

The vibrations such as, for example, an idle vibration and a shake vibration are normally input to the vibration isolator 10. The idle vibration among the vibrations is relatively small in amplitude but is high in frequency, and the shake vibration is low in frequency but is great in amplitude. Therefore, when such normal vibrations are input, the flow rate of the liquid L flowing into the communicating passage 30 is increased to a predetermined level or more.

As a result, for example, pressure loss of the liquid L is increased due to energy loss when the liquid L whose flow is changed by the flow changing protrusion 31 and the liquid L directly flowing toward the passing hole 34 collide with each other, and so on. Also, since the guide surface 32 of the flow changing protrusion 31 is formed in the concave curved surface shape which is recessed in the axis O direction, the flow of the liquid L is changed by the flow changing protrusion 31, thereby reversing a direction of the flow with respect to the axis O direction. In other words, since the guide surface 32 in the embodiment includes the first curved surface and the second curved surface as described above, the liquid L flows from the base end 31a toward the projecting end 31b along the guide surface 32 so that the flow of the liquid L flowing in the communicating passage 30 in the first direction and reaching the guide surface 32 is changed in the second direction substantially opposite to the first direction. Therefore, the liquid L (the liquid L whose flow direction is changed) collides with another part of the liquid L directly flowing toward the passing hole 34 from an opposite side in the axis O direction, thereby effectively increasing the pressure loss of the liquid L. Thus, the vibrations are absorbed and attenuated. Examples of other factors increasing the pressure loss of the liquid L may include viscous resistance of the liquid L, energy loss due to friction between the liquid L and the guide surface 32, and so on.

Since the guide surface 32 is provided line-asymmetrically with respect to the axis (the axis O in the embodiment) of the communicating passage 30 in the embodiment, the flow changing protrusion 31 at which the guide surface 32 is provided is also provided line-asymmetrically with respect to the axis of the communicating passage 30 (see FIGS. 2 and 3). In other words, the flow changing protrusion 31 is provided at one (the reference flat surface 30a) of two places on the inner circumferential surface (the reference flat surface 30a and the opposite flat surface 30b) of the communicating passage 30 opposite to each other to surround the axis. For this reason, the flow changing protrusion 31 is easily disposed near a central portion (in the vicinity of the axis) of the communicating passage in which the flow rate of the liquid L flowing in the communicating passage 30 in the axial direction is highest, and the guide surface 32 is easily disposed near the central portion. Therefore, the liquid L flowing along the central portion of the communicating part 30 at a high flow rate (the liquid L with high kinetic energy) can be caused to effectively collide with the guide surface 32 of the flow changing protrusion 31 to increase the pressure loss of the liquid L, so that attenuation of the vibrations can be increased. Note that, since the liquid flowing in the vicinity of the inner circumferential surface of the communicating passage receives frictional resistance from the inner circumferential surface, the flow rate of the liquid flowing along the central portion of the communicating passage is generally higher than that of the liquid flowing in the vicinity of the inner circumferential surface.

If the pressure loss of the liquid L increases as described above, flow resistance of the liquid L passing through the communicating passage 30 increases. As a result, flow resistance of the restriction passage 41 becomes relatively lower than flow resistance of the communicating passage 30, and the liquid L actively flows through the restriction passage 41 between the main liquid chamber 14 and the subsidiary liquid chamber 15. In this case, resonance occurs in the restriction passage 41, thereby further absorbing and attenuating the input vibrations.

For example, minute vibrations higher than a predetermined frequency and remarkably smaller in amplitude, are unintentionally input to the vibration isolator 10 in some cases. When the minute vibrations are input, the flow rate of the liquid L flowing into the communicating passage 30 is slow. Thus, even if the How changing protrusion 31 changes the flow of the liquid L in the communicating passage 30, the pressure loss of the liquid L is suppressed, and the liquid L passes in the passing hole 34 and smoothly flows between the main liquid chamber 14 and the subsidiary liquid chamber 15. As a result, an increase of the dynamic spring constant is suppressed.

As described above, according to the vibration isolator 10 related to the embodiment, the pressure loss of the liquid L is increased according to the flow rate of the liquid L flowing in the communicating passage 30 so that the vibrations can be absorbed and attenuated. Thus, for example, when normal vibrations such as an idle vibration and a shake vibration are input, the vibrations can be absorbed and attenuated irrespective of frequencies of the vibrations. Therefore, the occurrence of abnormal noise is suppressed while a plurality of types of vibrations with different frequencies are absorbed and attenuated so that simplification of a structure and facilitation of manufacture can be achieved.

In addition, for example, when the normal vibrations are input, the vibrations can also be absorbed and attenuated by the pressure loss of the liquid L and the resonance in the restriction passage 41. Thus, the vibrations can be effectively absorbed and attenuated.

Also, while the pressure loss of the liquid L with a slow flow rate is suppressed, the liquid L smoothly flows in the communicating passage 30, thereby suppressing the increase of the dynamic spring constant. Therefore, for example, when the flow rate of the liquid L is slower than when normal vibrations are input such as when unintentional vibrations such as minute vibrations higher in frequency and remarkably smaller in amplitude than the normal vibrations are input, the increase of the dynamic spring constant can be suppressed. As a result, product features of the vibration isolator 10 can be easily secured.

Note that the technical scope of the present invention is not limited to the embodiment and can be modified in various ways without departing from, the gist of the present invention.

Figure 4:
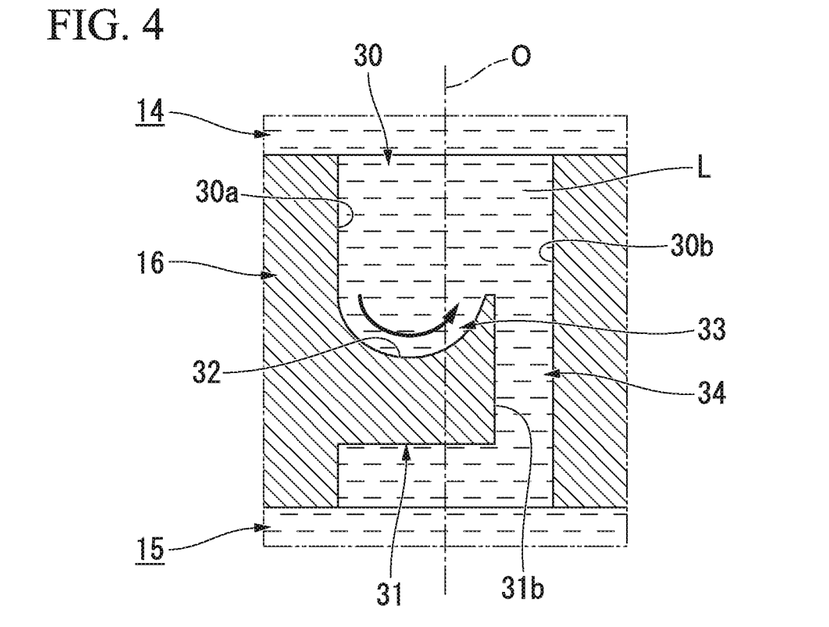
FIG. 4 is an enlarged view of a major part of a longitudinal cross-sectional view of a vibration isolator related to a first modified example of the present invention.

For example, as in a first modified example shown in FIG. 4, the flow changing protrusion 31 may be provided at a position shifted in the axis O direction from the opening of the communicating passage 30 in the partition member 16.

Figure 5:
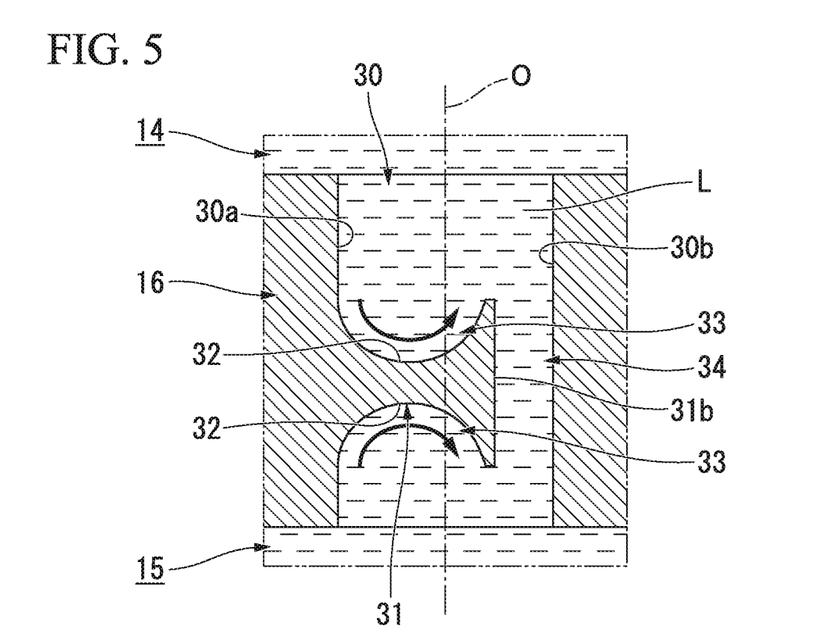
FIG. 5 is an enlarged view of a major part of a longitudinal cross-sectional view of a vibration isolator related to a second modified example of the present invention.

Also, as in a second modified example shown in FIG. 5, the flow changing protrusion 31 may be provided at a position shifted in the axis O direction from the opening of the communicating passage 30 in the partition member 16, and the guide surfaces 32 may be provided at both end surfaces of the flow changing protrusion 31 in the axis O direction.

Figure 6:
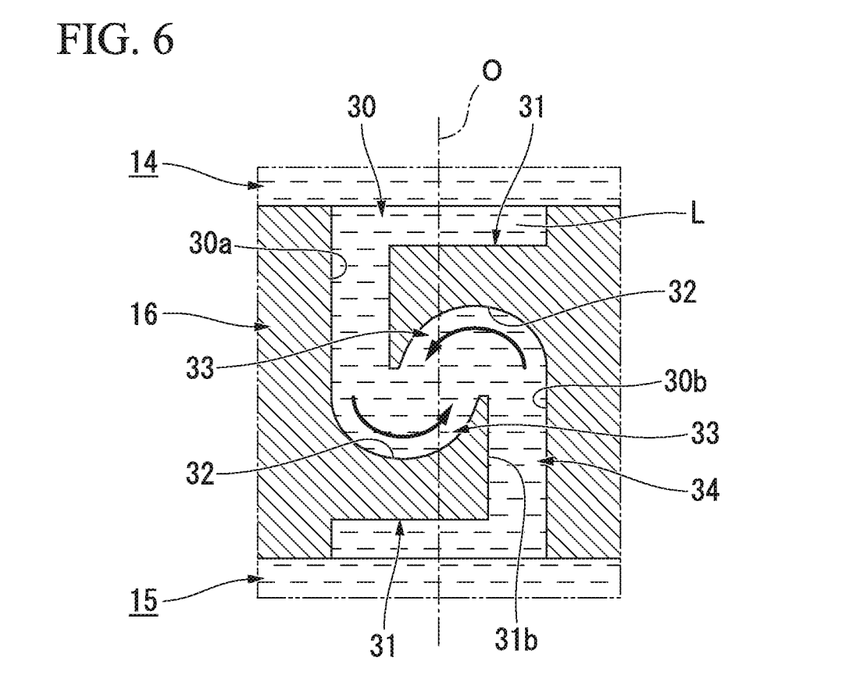
FIG. 6 is an enlarged view of a major part of a longitudinal cross-sectional view of a vibration isolator related to a third modified example of the present invention.

As in a third modified example shown in FIG. 6, the pair of flow changing protrusions 31 may be provided at an interval in the axis O direction, the guide surface 32 facing the first side in the axis O direction may be provided at the flow changing protrusion 31 (a lower side of FIG. 6) provided at the second side in the axis O direction, and the guide surface 32 facing the second side in the axis O direction may be provided at the flow changing protrusion 31 (an upper side of FIG. 6) provided at the first side in the axis O direction. The pair of flow changing protrusions 31 individually protrude from the inner circumferential surface of the communicating passage 30 opposite to each other to surround the axis O (e.g., the reference flat surface 30a and the opposite flat surface 30b) in the modified example. Also, the guide surfaces 32 of the pair of flow changing protrusions 31 face in the axis O direction.

Among these, in the second modified example and the third modified example shown in FIGS. 5 and 6, the liquid L flowing into the communicating passage 30 from the main liquid chamber 14 and the liquid L flowing into the communicating passage 30 from the subsidiary liquid chamber 15 can both reach the guide surfaces 32 of the present invention. Thus, the pressure loss of the liquid L can be effectively increased.

One flow changing protrusion 31 is provided in the communicating passage 30 in the embodiment, but the present invention is not limited thereto. For example, the plurality of flow changing protrusions may be disposed in the communicating passage at different positions in the axis direction. Also, for example, the plurality of flow changing protrusions may be disposed in the communicating passage at the same position in the axis direction. In this case, for example, the plurality of flow changing protrusions can be intermittently disposed throughout the entire circumference in the circumferential direction.

The flow changing protrusion 31 is not limited to the constitution shown in the embodiment. For example, the flow changing protrusion may be formed in a tubular shape which extends in the axis direction. In this case, for example, the flow changing protrusion can be formed in a tubular shape whose diameter is gradually decreased from the first side in the axis direction toward the second side, and the inner circumferential surface and the outer circumferential surface of the flow changing protrusion can be formed in a concave curved surface shape which is recessed in the axis direction.

Also, the main liquid chamber 14 and the subsidiary liquid chamber 15 are communicated via the restriction passage 41 different from the communicating passage 30 in addition to the communicating passage 30 in the embodiment, but the present invention is not limited thereto. For example, the main liquid chamber and the subsidiary liquid chamber may be communicated only via the communicating passage without the restriction passage.

The restriction passage 41 and the communicating passage 30 may be closed by a membrane body elastically deformed due to pressure of the liquid L such as, for example, an elastic thin membrane in the embodiment. Even in this case, the liquid pressure of the liquid L at both sides surrounding the membrane body is transferred via the membrane body so that the liquid L flows in the restriction passage 41 and the communicating passage 30.

Also, the restriction passage 41 may be omitted.

One communicating passage 30 may be provided or the plurality of communicating passages 30 may be provided in the present invention. When the plurality of communicating passages are provided, for example, the plurality of communicating passages may be provided on concentric circles which extend in the circumferential direction to form an annular row of the communicating passages, and the plurality of annular rows having different diameters may be provided.

The communicating passage 30 is formed in a polygonal columnar shape in the embodiment, but the present invention is not limited thereto. For example, the communicating passage may be formed in a columnar shape.

Also, the communicating passage 30 is disposed coaxially with the axis O in the embodiment, but the present invention is not limited thereto. For example, the axis of the communicating passage may be shifted in the radial direction (a direction perpendicular to the axis O) with respect to the axis O while the communicating passage extends in the axis O direction. In addition, the communicating passage may extend in the circumferential direction or in the radial direction. For example, the communicating passage of the present invention extending in the circumferential direction or in the radial direction and a connection passage configured to connect the communicating passage and the first and second liquid chambers may be formed in the partition member. Note that the axis of the communicating passage is the central axis thereof and is, for example, the line passing through the center of gravity of the shape seen in a cross section of the communicating passage.

The flow changing protrusion 31 is provided at a position crossing the axis (the axis O in the embodiment) of the communicating passage 30 in the embodiment. However, the flow changing protrusion of the present invention may be provided not to cross the axis of the communicating passage, and for example, the flow changing protrusion may be provided at the left region of the axis O in FIG. 2.

The partition member 16 is configured to partition the liquid chamber in the first attachment member 11 into the main liquid chamber 14 having the elastic body 13 as a portion of the wall surface and the subsidiary liquid chamber 15 in the embodiments, but is not limited thereto. For example, the pair of elastic bodies may be provided in the axis direction instead of the diaphragm being provided, and a pressure receiving liquid chamber having the elastic body as a portion of the wall surface may be provided instead of the subsidiary liquid chamber being provided. In other words, the partition member partitions the liquid chamber in the first attachment member in which the liquid is sealed into the first liquid chamber and the second liquid chamber, and at least one of the liquid chambers, and so on, the first liquid chamber and the second liquid chamber, may be appropriately changed to another constitution having the elastic body as a portion of the wall surface. In other words, a portion of the wall surface in at least one of the group consisting of the main liquid chamber 14 and the subsidiary liquid chamber 15 may be formed using the elastic body 13.

The case in which the engine is connected to the second attachment member 12 and the first attachment member 11 is connected to the vehicle body has been described in the embodiment, but a constitution in which these connections are reversed is also possible.

The vibration isolator 10 according to the present invention is not limited to an engine mount of the vehicle and can also be applied to components other than the engine mount. For example, the vibration isolator can also be applied to mounts of electric generators mounted on construction machines or can also be applied to, for example, mounts of machines installed at factories.

In addition, the constituent elements of the above-described, embodiments can be appropriately replaced with well-known constituent elements without departing from the gist of the present invention, and appropriately combined with the modified examples described above.

INDUSTRIAL APPLICABILITY

The present invention can be applied to a vibration isolator configured to absorb and attenuate vibrations of vibration generating parts.

REFERENCE SIGNS LIST

10: vibration isolator
11: first attachment member
12: second attachment member
13: elastic body
14: main liquid chamber (first liquid chamber)
15: subsidiary liquid chamber (second liquid chamber)
16: partition member
30: communicating passage
31: flow changing protrusion
31b: projecting end
32: guide surface
34: passing hole
41: restriction passage
L: liquid

What is claimed is:

1. A vibration isolator in which a portion of a wall surface in at least one of a first liquid chamber and a second liquid chamber is formed using an elastic body, the vibration isolator comprising:
a first tubular attachment member coupled to one of a vibration generating part and a vibration receiving part;
a second attachment member coupled to the other of the vibration generating part and the vibration receiving part;
the elastic body configured to couple together the first tubular attachment member and the second attachment member; and
a partition member configured to partition a liquid chamber in the first tubular attachment member in which a liquid is sealed into the first liquid chamber and the second liquid chamber,
wherein a communicating passage between the first liquid chamber and the second liquid chamber is provided in the partition member,
a flow changing protrusion protruding from an inner circumferential surface of the communicating passage and configured to change a flow of the liquid flowing in the communicating passage in its axial direction is provided at the inner circumferential surface thereof;

the flow changing protrusion comprises a guide surface facing the communicating passage and intersecting the axial direction;

a passing hole which is open toward both sides in the axial direction is formed by a projecting end of the flow changing protrusion and another portion on the inner circumferential surface of the communicating passage, wherein the passing hole is open towards the first liquid chamber and the second liquid chamber;

the flow changing protrusion forms a rigid body and is configured to change a flow of the liquid flowing in the communicating passage and reaching the guide surface toward the projecting end; and the guide surface is formed with a concave curved surface shape which is recessed in the axial direction.

2. The vibration isolator according to claim 1, wherein the guide surface faces an opening of the communicating passage in the partition member in the axial direction.

3. The vibration isolator according to claim 1, wherein a restriction passage provided at a different position from the communicating passage and configured to provide communication between the first liquid chamber and the second liquid chamber is provided in the partition member.

4. The vibration isolator according to claim 1, wherein the guide surface is provided line-asymmetrically with respect to the axis of the communicating passage.

5. The vibration isolator according to claim 1, wherein the flow changing protrusion is configured to cause the liquid flowing in the communicating passage in a first direction and reaching the guide surface to flow along the guide surface in the concave curved surface shape to change a flow of the liquid to a second direction substantially opposite to the first direction.

6. A vibration isolator comprising:
a tubular attachment housing;
an attachment member;
an elastic body coupling the tubular attachment housing and the attachment member;
a first liquid chamber and a second liquid chamber located inside the tubular attachment housing; and
a partition for partially separating the first liquid chamber and the second liquid chamber, wherein the partition comprises:
a communicating passage connecting the first liquid chamber and the second liquid chamber,
a rigid flow changing protrusion extending from an inner surface of the communicating passage, wherein the rigid flow changing protrusion is configured to change a flow of liquid flowing in the communicating passage,
a concave guide surface, located on the flow changing protrusion, facing the communicating passage, wherein the concave guide surface is recessed in an axial direction of the vibration isolator,
a passing hole open towards the first liquid chamber and the second liquid chamber.

7. The vibration isolator according to claim 6, further comprising a second concave guide surface, located on an opposite side of the flow changing protrusion, wherein the second concave guide surface is recessed in an axial direction of the vibration isolator.

* * * * *